United States Patent
Lee et al.

(10) Patent No.: US 11,550,328 B2
(45) Date of Patent: Jan. 10, 2023

(54) ARTIFICIAL INTELLIGENCE APPARATUS FOR SHARING INFORMATION OF STUCK AREA AND METHOD FOR THE SAME

(71) Applicant: LG ELECTRONICS INC., Seoul (KR)

(72) Inventors: Kamin Lee, Seoul (KR); Kokeun Kim, Seoul (KR); Suyeon Kim, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 423 days.

(21) Appl. No.: 16/708,395

(22) Filed: Dec. 9, 2019

(65) Prior Publication Data

US 2021/0116929 A1   Apr. 22, 2021

(30) Foreign Application Priority Data

Oct. 21, 2019  (KR) .................. 10-2019-0130932

(51) Int. Cl.
*G05D 1/02*  (2020.01)
*G05D 1/00*  (2006.01)
(Continued)

(52) U.S. Cl.
CPC ............ *G05D 1/0221* (2013.01); *A47L 9/009* (2013.01); *A47L 9/2852* (2013.01); *A47L 9/2894* (2013.01);
(Continued)

(58) Field of Classification Search
CPC .............. G05D 1/0221; G05D 1/0088; G05D 2201/0203; G05D 2201/0215; G05D 1/0227; G05D 1/0251; G05D 1/0274; G05D 1/0214; G05D 1/0238; G05D 1/0276; G05D 1/0287; A47L 9/009; A47L 9/2852; A47L 9/2894; A47L 5/24; A47L 2201/04; A47L 9/2805; A47L 9/2836; A47L 11/4011; A47L 11/4061; A47L 2201/06; B25J 9/161; B25J 9/1669; B25J 9/1682; B25J 11/0085; B25J 9/163; B25J 9/1666; B25J 9/1676; G06N 3/08; G05B 2219/39165; G05B 2219/39315
See application file for complete search history.

(56) References Cited

U.S. PATENT DOCUMENTS

2016/0167226 A1* 6/2016 Schnittman .............. G06T 7/55
                                                                901/1
2017/0150863 A1* 6/2017 Kim ................... A47L 11/4008
(Continued)

*Primary Examiner* — Bao Long T Nguyen
(74) *Attorney, Agent, or Firm* — Lee, Hong, Degerman, Kang & Waimey PC

(57) ABSTRACT

An AI apparatus and an operating method are provided, the AI apparatus includes a communication interface to receive 3D sensor data and bumper sensor data from a first cleaner, a processor to generate surrounding situation map data based on the 3D sensor data and the bumper sensor data, and a learning processor to generate learning data by labeling area classification data for representing whether the surrounding situation map data corresponds to the stuck area, and to train a stuck area classification model based on the learning data. The processor transmits the trained stuck area classification model to a second cleaner through the communication interface.

16 Claims, 8 Drawing Sheets

(51) Int. Cl.
*A47L 9/00* (2006.01)
*A47L 9/28* (2006.01)
*A47L 5/24* (2006.01)

(52) U.S. Cl.
CPC .............. *G05D 1/0088* (2013.01); *A47L 5/24* (2013.01); *A47L 2201/04* (2013.01); *G05D 2201/0203* (2013.01); *G05D 2201/0215* (2013.01)

(56) References Cited

U.S. PATENT DOCUMENTS

2017/0332862 A1\* 11/2017 Jun ........................ A47L 9/2873
2019/0197396 A1\* 6/2019 Rajkumar ................ G06N 3/08
2020/0174489 A1\* 6/2020 Jung .................... G06V 10/768

\* cited by examiner

ARTIFICIAL INTELLIGENCE APPARATUS FOR SHARING INFORMATION OF STUCK AREA AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0130932, filed on Oct. 21, 2019, the contents of which are hereby incorporated by reference herein in its entirety.

BACKGROUND

The present disclosure relates to an artificial intelligence (AI) apparatus capable of sharing information of a stuck area, and a method for the same.

Artificial intelligence (AI) refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Research has been actively conducted into technology of recognizing and learning a surrounding situation using AI and providing information desired by a user in the desired form or performing an operation or function desired by the user.

An electronic device for providing such various operations and functions is referred to as an AI device.

Meanwhile, the robot cleaner may clean while traveling by itself.

However, when cleaning, the robot cleaner may not move due to the layout of furniture or a building structure.

Accordingly, there is increasingly required preventing a situation that the robot cleaner may not move.

SUMMARY

An object of the present disclosure is to solve the above-described problem or other problems.

The present disclosure provides an AI apparatus enabling a plurality of cleaners to share information of a stuck area together such that a cleaner escapes from the stuck area, and a method for the same.

The present disclosure provides an AI apparatus capable of training a stuck area classification model based on sensing data and path data of the first cleaner and transmitting the trained stuck area classification model to a second cleaner such that the second cleaner escapes from the stuck area, and a method for the same.

According to an embodiment, an AI apparatus includes a communication interface to receive 3D sensor data and bumper sensor data from a first cleaner, a processor to generate surrounding situation map data based on the 3D sensor data and the bumper sensor data, and a learning processor to generate learning data by labeling area classification data for representing whether the surrounding situation map data corresponds to the stuck area, and to train a stuck area classification model based on the learning data.

The processor transmits the trained stuck area classification model to a second cleaner through the communication interface.

According to an embodiment, a method for sharing information of a stuck area includes receiving three dimensional (3D) sensor data and bumper sensor data from a first cleaner, generating surrounding situation map data based on the 3D sensor data and the bumper sensor data, generating learning data by labeling area classification data for representing whether the surrounding situation map data corresponds to the stuck area, training a stuck area classification model based on the learning data, and transmitting the trained stuck area classification model to a second cleaner.

As described above, according to an embodiment of the present disclosure, the robot cleaner may utilize the trained model using information collected by other cleaners to escape the stuck area without trial and error.

In addition, according to various embodiments of the present disclosure, the model trained with the exact escape path may be generated by using information collected by a vacuum cleaner moving through the operation of a user.

In addition, according to various embodiments of the present disclosure, the cleaner may detect the stuck area even if the layout of the furniture is changed as the cleaner uses the model trained based on the surrounding situation map data.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
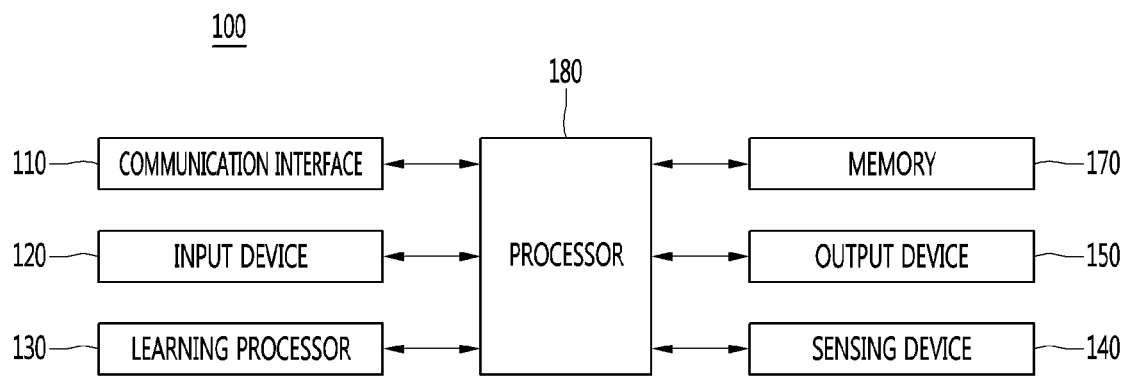
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the present disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving unit, and may travel on the ground through the driving device or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input device 120, a learning processor 130, a sensing device 140, an output device 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input device 120 may acquire various kinds of data.

At this time, the input device 120 may include a camera for inputting a video signal, a microphone for receiving an audio signal, and a user input device for receiving information from a user. The camera or the microphone may be treated as a sensor, and the signal acquired from the camera or the microphone may be referred to as sensing data or sensor information.

The input device 120 may acquire a learning data for model learning and an input data to be used when an output is acquired by using learning model. The input device 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

At this time, the output device 150 may include a display device for outputting time information, a speaker for outputting auditory information, and a haptic module for outputting haptic information.

The memory 170 may store data that supports various functions of the AI device 100. For example, the memory 170 may store input data acquired by the input device 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
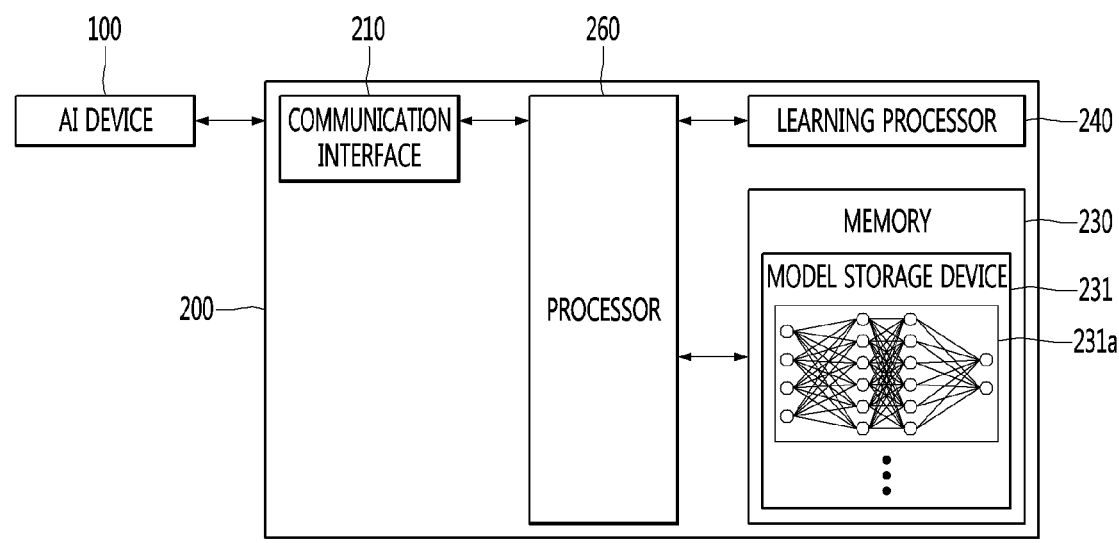
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage device 231. The model storage device 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
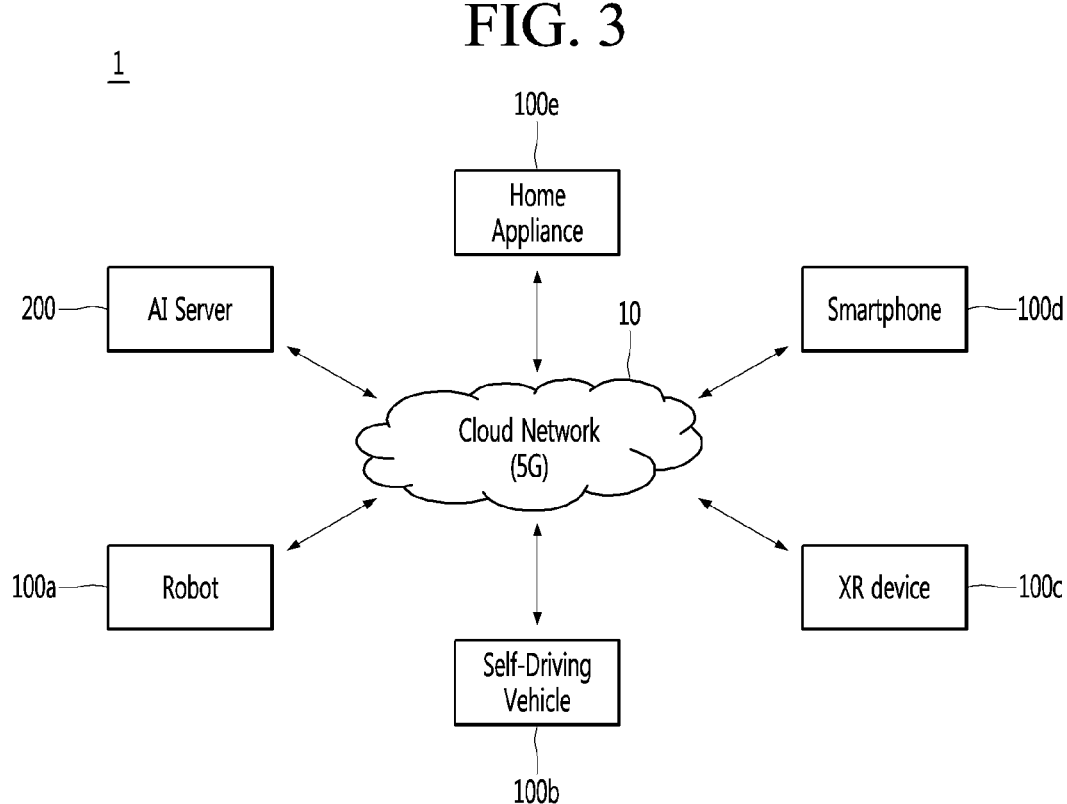
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving device such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving device such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle

100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving device of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
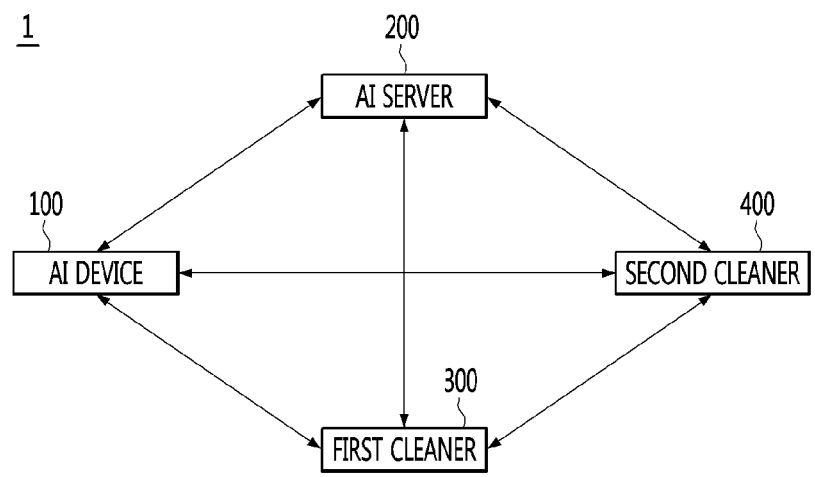
FIG. 4 is a view illustrating an AI system, according to an embodiment of the present disclosure.

FIG. 4 is block diagram illustrating an AI system according to an embodiment of the present disclosure.

Referring to FIG. 4, the AI system 1 sharing an area (stuck area) having the hazard of confinement according to an embodiment of the present disclosure may include at least one of an AI device 100, the AI server 200, a first cleaner 300, or a second cleaner 400.

In this case, the AI apparatus 100 may be provided in the form of a module and may be mounted on the first cleaner 300 or the second cleaner 400.

In the AI system 1 of FIG. 4, the AI apparatus 100 may include one of the first cleaner 300 or the second cleaner 400, and the cleaner equipped with the AI function may be called the AI apparatus 100.

The AI apparatus 100, the AI server 200, the first cleaner 300, and the second cleaner 400 may communicate with each other using a wired or wireless communication technology.

Each of the devices 100, 200, 300, and 400 may communicate with each other through a base station, a router, or the like, but may also directly communicate with each other using a short range communication technology.

In addition, the devices 100, 200, 300, and 400 may communicate with each other using Wifi communication.

Figure 5:
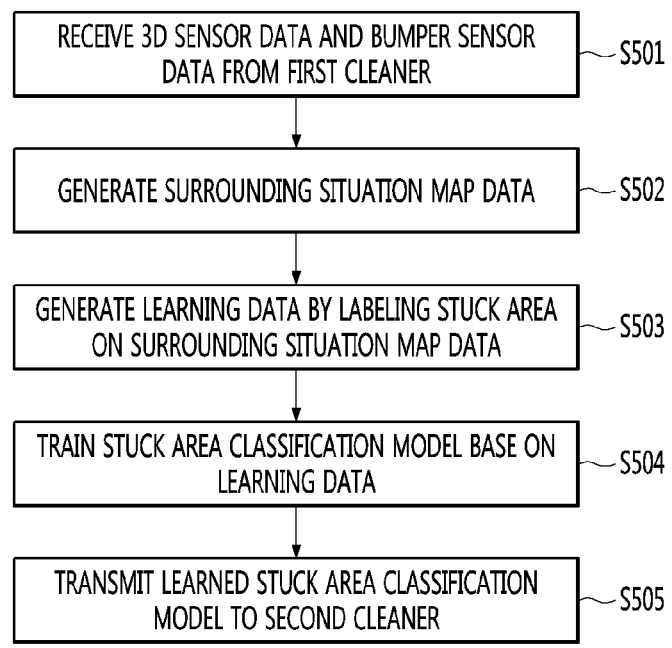
FIG. 5 is a flowchart illustrating the method for sharing the information on the stuck area, according to an embodiment of the present disclosure.

FIG. 5 is a flowchart illustrating a method for sharing the information on the stuck area, according to an embodiment of the present disclosure.

The communication interface 110 may receive three-dimensional (3D) sensor data and bumper sensor data from the first cleaner 300 (S501).

The first cleaner 300 may acquire 3D sensor data and bumper sensor data through at least one sensor during cleaning.

The 3D sensor data may be data sensed through the 3D sensor, and the 3D sensor may be a depth sensor.

The depth sensor may detect that light emitted from the light emitting device is reflected from the object and returned. The depth sensor may measure a distance to an object based on the difference between times at which the returning light is sensed, and an amount of the returning light.

The depth sensor may acquire two-dimensional (2D) image information or 3D image information around the first cleaner 300 based on the measured distance between objects.

The first cleaner 300 may include at least one 3D sensor on the front of the main body.

In addition, the bumper sensor data may be data on a bumper event measured through the bumper sensor.

The bumper sensor may measure an impulse applied to the bumper. The bumper sensor may make a bumper event occurring when sensing an impulse equal to or greater than a preset impulse.

In the first cleaner 300, at least one bumper sensor may be provided on each surface of the main body. For example, a bumper sensor may be provided on each of the front surface, and left and right surfaces of the head of the first cleaner 300. The bumper sensor data may include data about bumper events detected by the plurality of bumper sensors of the first cleaner 300.

The memory 170 may store the received 3D sensor data and the bumper sensor data.

The processor 180 may generate the surrounding situation map data based on the 3D sensor data and the bumper sensor data (S502).

The surrounding situation map data may include 3D sensor data and bumper sensor data detected based on the position of the first cleaner 300 on the cleaning map.

The processor 180 may generate the surrounding situation map data based on the 3D sensor data and the bumper sensor for a preset time.

The processor 180 may generate a surrounding map representing the surrounding situation map data.

The memory 170 may store surrounding situation map data.

Figure 6:
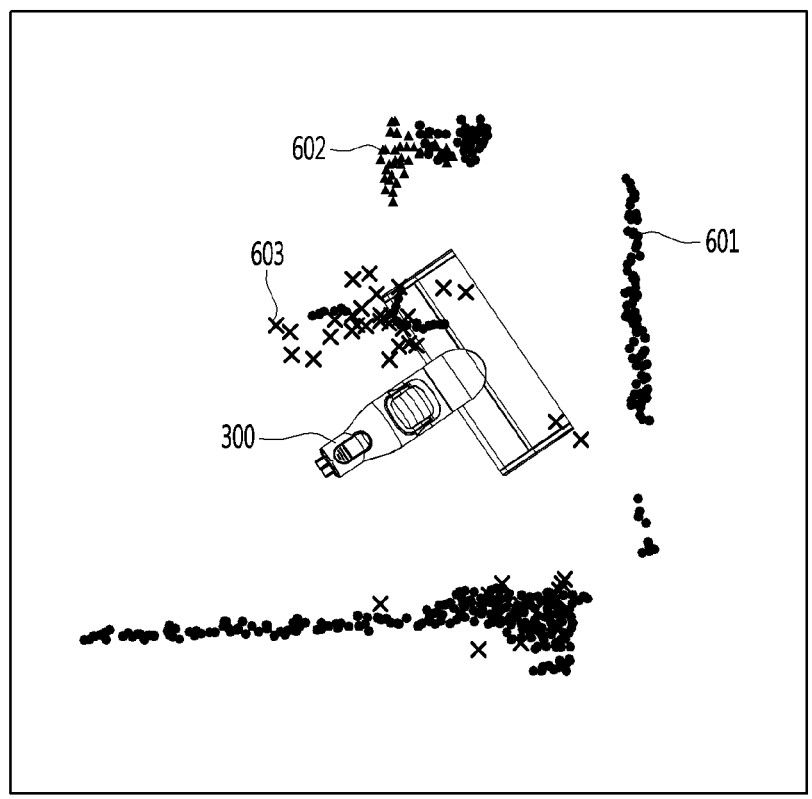
FIG. 6 is a view illustrating surrounding situation map data according to an embodiment of the present disclosure.

Referring to FIG. 6, a surrounding map representing the surrounding map data is illustrated The processor 180 may convert the 3D sensor data into dots 601 in the first color or dots 602 in the second color, to represent the object sensed around the first cleaner 300. For example, the dots 601 in the first color may be dots representing an object sensed at a lower place close to the floor in the surrounding space of the first cleaner 300. In addition, the dots 602 in the second color may be dots representing objects sensed at a higher place spaced apart from the floor in the surrounding space of the first cleaner 300.

The processor 180 may convert the bumper event into dots 603 which are in the third color. For example, the processor 180 may convert bumper events, which are acquired for a preset time, into dots 603 in the third color.

The learning processor 130 may generate the learning data by labeling the area classification data representing whether the surrounding situation map data corresponds to the stuck area (S503).

The learning processor 130 may determine whether the surrounding situation map data corresponds to the stuck area based on the bumper sensor data, and may label the area classification data for classifying the surrounding situation map data, which corresponds to the stuck area, as being corresponding to the stuck area.

The area classification data may be answer data for surrounding situation map data. For example, the area classification data may be answer data for an area having no hazard of confinement (a non-stuck area) and a stuck area. In addition, the area classification data may be answer data for classifying the stuck area based on an escape direction indicated from the escape path data of the first cleaner.

Figure 8:
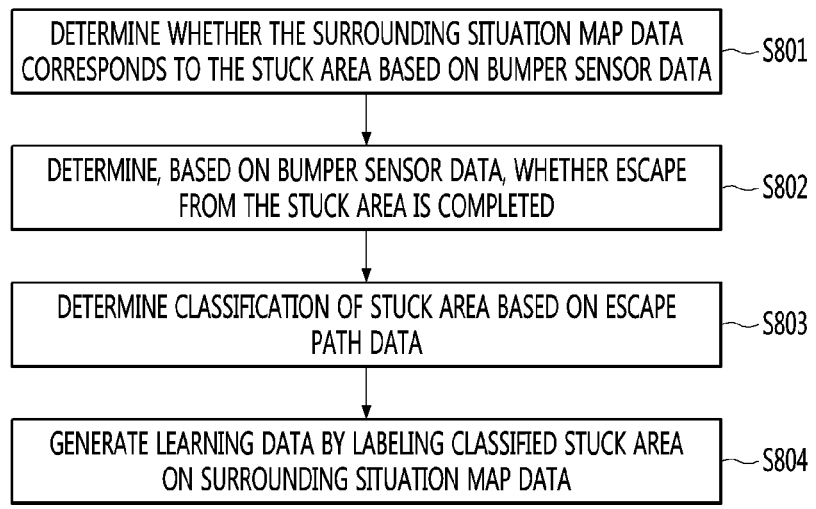
FIG. 8 is a flowchart illustrating a method for generating learning data according to an embodiment of the present disclosure.

FIG. 8 is a flowchart illustrating a method for generating learning data according to an embodiment of the present disclosure.

The learning processor 130 may determine whether the surrounding situation map data corresponds to the stuck area based on the bumper sensor data (S801).

The learning processor 130 may determine that the surrounding situation map data for a preset time corresponds to the stuck area, when the number of times that bumper events occur for the preset time is the preset number of times.

For example, when the first cleaner 300 cleans a place having many obstacles, the bumper sensor of the first cleaner 300 may sense a large number of bumper events, and the AI apparatus 100 may receive the bumper sensor data including the large number of buffer events sensed by the first cleaner. In this case, when the preset number of times or more of the bumper events occur for the preset time, the learning processor 130 may determine the surrounding situation map data, which are generated based on the 3D sensor data acquired by the first cleaner 300 for the preset time, as corresponding to the stuck area.

In addition, when the preset number of times or more of bumper events occur in a plurality of bumper sensors of the first cleaner 300 for the preset time, the learning processor 130 may determine the surrounding situation map data for the preset time as corresponding to the stuck area.

For example, the first cleaner 300 may include the plurality of bumper sensors provided on the surfaces of the main body. When the first cleaner 300 cleans a narrower place having many obstacles, the bumper sensors provided on the surfaces of the main body may sense a large number of bumper events. The AI apparatus 100 may receive bumper sensor data including the large number of bumper events sensed by the plurality of bumper sensors of the first cleaner 300. In this case, the learning processor 130 may determine that the preset number of times or more of bumper events may occur in the plurality of bumper sensors of the first cleaner 300 for the preset time, and may determine that the surrounding situation map data, which are generated based on the 3D sensor data acquired from the first cleaner 100 for the preset time, corresponds to the stuck area.

The learning processor 130 may label the area classification data, which is used for the classification as the stuck area, on the surrounding situation map data corresponding to the stuck area.

For example, the learning processor 130 may label the surrounding situation map data, which is determined as corresponding to the stuck area, with the stuck area, and may label the surrounding situation map data, which is determined not to correspond to the stuck, with the non-stuck area.

In addition, when determining the surrounding situation map data to correspond to the stuck area, the learning processor 130 may classify the type of the stuck area based on the escape path data of the first cleaner 300 and label the type of the stuck area on the surrounding situation map data based on the classified stuck area.

The learning processor 130 may acquire escape path data until the first cleaner 300 completes the escape from the stuck area, based on the path data and the surrounding situation map data of the first cleaner 300, which are received through the communication interface 110.

The learning processor 130 may determine, based on the bumper sensor data, whether the first cleaner 300 completes the escape from the stuck area (S802).

For example, the learning processor 130 may determine that the first cleaner 300 completes the escape, when any bumper event does not occur for the preset time from a confinement time point at which the surrounding situation map data is determined as being corresponding to the stuck area.

In this case, the learning processor 130 may acquire the escape path data based on the path data of the first cleaner 300 from after the confinement time point.

In addition, the learning processor 130 may determine that the first cleaner 300 completes the escape from the stuck area, when the preset number of times of bumper events or less occurs for the preset time from after the confinement time point at which the surrounding situation map data is determined as corresponding to the stuck area.

The learning processor 130 may determine the classification of the stuck area based on the escape path data (S803).

The learning processor 130 may classify the escape path data based on the similarity of the path data, and may specify the classification of the stuck area for each classified escape path data.

For example, the learning processor 130 may classify the escape path data into front escape path data, rear escape path data, a leftward escape path data, and a rightward escape path data in the escape directions of the escape path data.

The learning processor 130 may determine the classification of the stuck area of the surrounding situation map data based on the escape direction. For example, the learning processor 130 may classify the stuck area into a first stuck area, a second stuck area, a third stuck area, and a fourth stuck area with respect to front escape path data, rear escape path data, a leftward escape path data, and a rightward escape path data, respectively.

The learning processor 130 may determine the classification of the stuck area with respect to the surrounding situation map data corresponding to the stuck area, and may label an area classification data representing the classification of the determined stuck area, thereby generating learning data.

The learning processor 130 may train the a stuck area classification model base on learning data (S504).

The stuck area classification model may be an artificial neural network (ANN) model used in machine learning. The stuck area classification model may include artificial neurons (nodes) that form a network by binding synapses. The stuck area classification model may be defined by a connection pattern between neurons at other layers, a learning process of updating model parameters, and an activation function generating an output value. The artificial neural network of the stuck area classification model may use any one of a support vector machine (SVM) and a convolutional neural network (CNN).

The stuck area classification model may include an input layer and an output layer, and selectively may include one or more hidden layers. Each layer include one or more neurons, and the artificial neural network may include a synapse to connect neurons with each other. Each neuron in the artificial neural network may output input signals input through the synapse, a weight, or a functional value of an activation function for deflection.

The stuck area classification model may be generated, based on the learning scheme, through supervised learning, unsupervised learning, or reinforcement learning.

For example, when the stuck area classification model is generated through the supervised learning, the supervised learning may be performed with a label for learning data. The label may refer to an answer (or a result value) which has to be inferred by the artificial neural network when the learning data is input into the artificial neural network.

The learning processor 130 may train the stuck area classification model using learning data designated with a label for specifying the classification of the stuck area.

The learning processor 130 may train the stuck area classification model such that the struction area is cognized, by labeling the stuck area classification on the stuck area classification model. Accordingly, when new surrounding situation map data is input, the stuck area classification model may output whether the surrounding situation data corresponds to the stuck area, or may output the type of the stuck area classified based on the escape path.

In addition, the stuck area classification model may be trained through unsupervised learning for training an artificial neural network in the state that the label on the learning data is not given, or through reinforcement learning for training an agent defined under a certain environment such that the agent performs an action to minimize the accumulated awards in each state or selects the sequence of the action.

Figure 7:
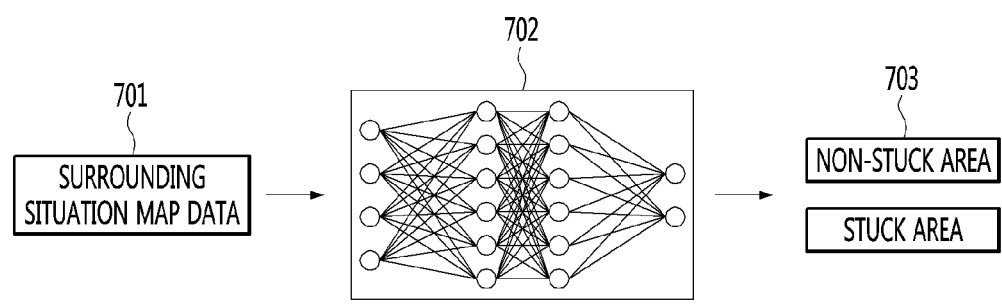
FIG. 7 is a view illustrating a stuck area classification model according to an embodiment of the present disclosure.

For example, referring to FIG. 7, when the learning data is data labeled with area classification data for representing whether each of the plurality of surrounding situation map data corresponds to the stuck area. When a stuck area classification model 702 receives new surrounding map data 701, the stuck area classification model may output an output value 703 for a non-stuck area or a stuck area.

Figure 9:
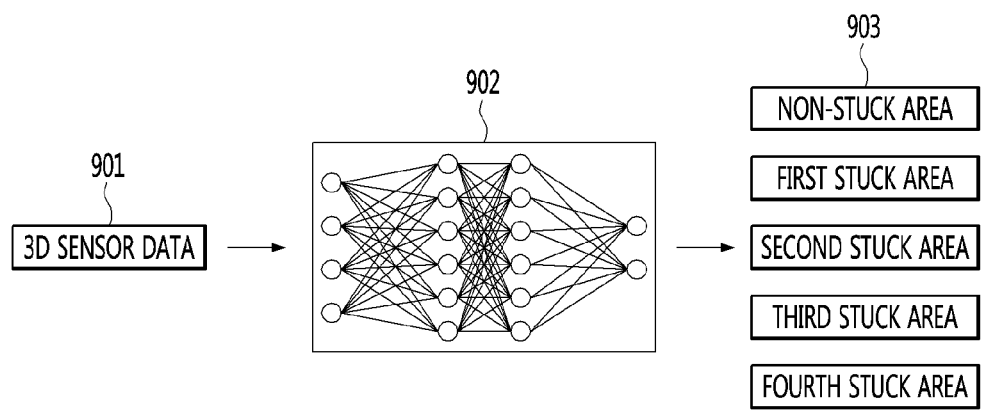
FIG. 9 is a view illustrating a stuck area classification model according to an embodiment of the present disclosure.

In addition, referring to FIG. 9, when the learning data is data acquired by labeling the area classification data for representing the classification of the stuck area classified based on the escape path with each of the plurality of surrounding situation map data. A stuck area classification model 902 may output output values 903 for a non-stuck area, a first stuck area, a second stuck area, a third stuck area, and a fourth stuck area, when new surrounding situation map data 901 is input. In this case, the first stuck area may refer to a stuck area allowing forward-escape, and the second stuck area may refer to a stuck area allowing rearward-escape, a stuck area for allowing leftward-escape, and a stuck area for allowing rightward-escape.

The memory 170 may store the trained stuck area classification model.

The processor 180 may transmit the stuck area classification model, which is trained through the communication interface 110, to the second cleaner 400.

Figure 10:
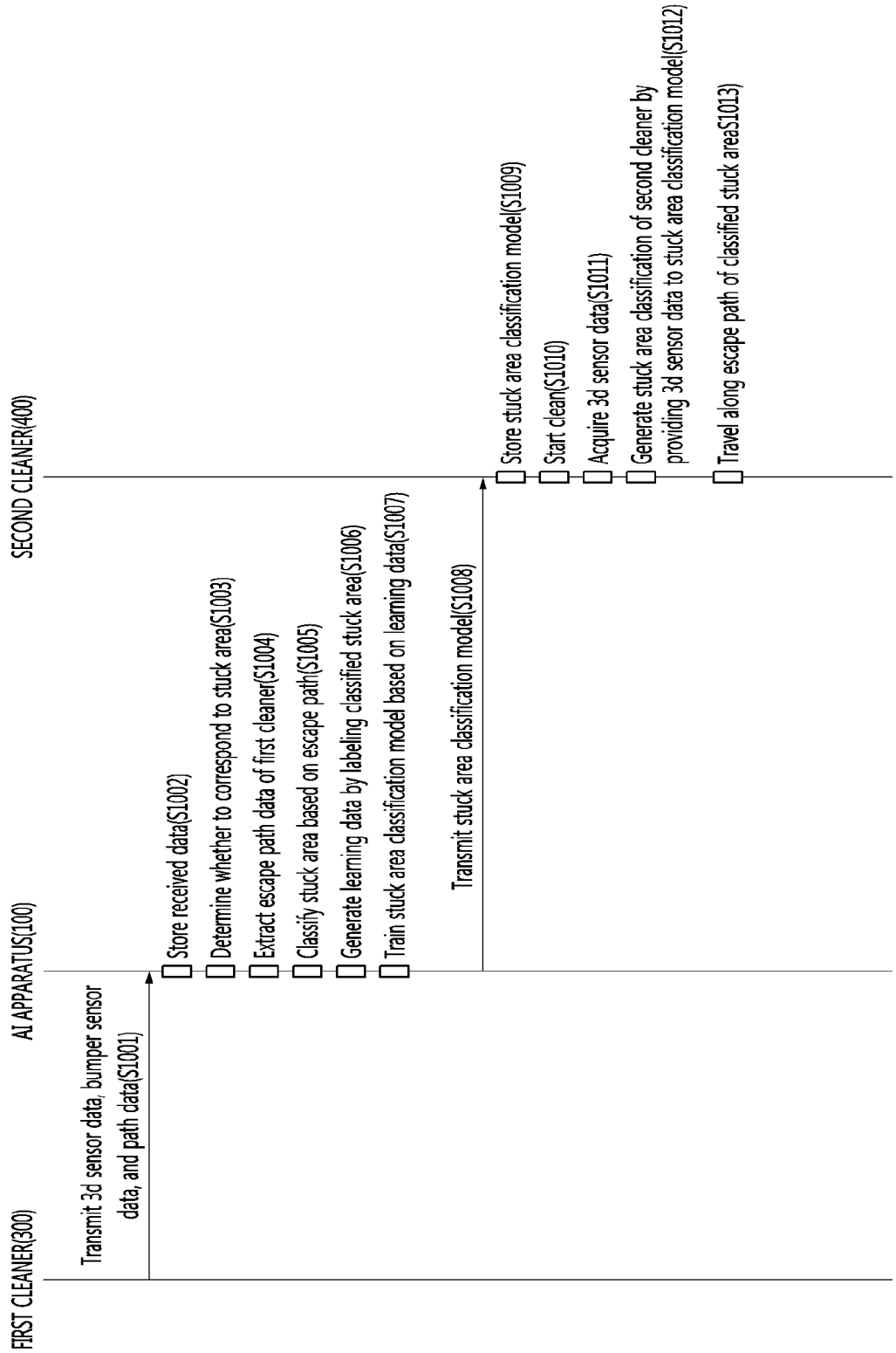
FIG. 10 is a view illustrating a method for sharing information on the stuck area between a plurality of cleaners according to an embodiment of the present disclosure.

FIG. 10 is a view illustrating a method for sharing information on the stuck area between the plurality of cleaners, according to an embodiment of the present disclosure.

The first cleaner 300 may transmit 3D sensor data, bumper sensor data, and path data to the AI apparatus 100.

Figure 11:
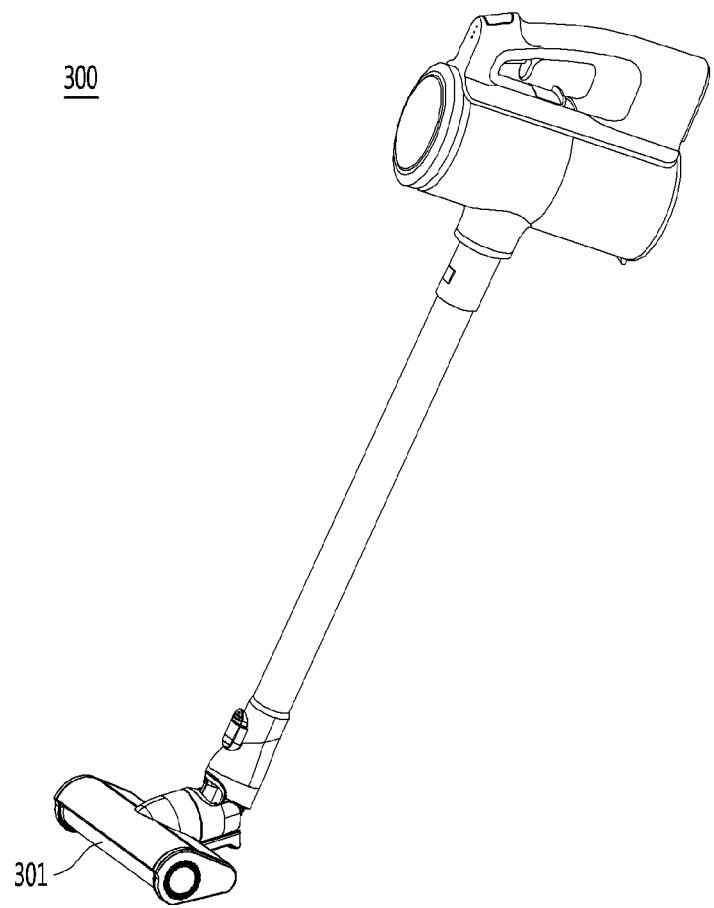
FIG. 11 is a view illustrating a first cleaner according to an embodiment of the present disclosure.

Referring to FIG. 11, the first cleaner 300 may be a wireless vacuum cleaner moving by the operation of a person or by an external force.

The first cleaner 300 may include at least one 3D sensor provided on the cleaner head 301 and may include at least one bumper sensor provided on surfaces of the cleaner head 301. For example, the first cleaner 300 may include bumper sensors provided on the front surface, the left surface, and the right surface of the head 301.

The AI apparatus 100 may store 3D sensor data, bumper sensor data, and path data in the memory 170 (S1002).

The AI apparatus 100 may generate the surrounding situation map data based on the 3D sensor data and may determine whether the generated surrounding situation map data corresponds to the stuck area (S1003).

The AI apparatus 100 may extract escape path data of the first cleaner 300 using the path data (S1004).

The AI apparatus 100 may determine the classification of the stuck area based on the escape path (S1005).

The AI apparatus 100 may generate learning data by labeling area classification data on the surrounding situation map data according to the classified stuck area (S1006).

The AI apparatus 100 may train the stuck area classification model based on the learning data (S1007).

The AI apparatus 100 may transmit the trained stuck area classification model to the second cleaner 400.

The second cleaner 400 may store, in the memory, the received stuck area classification model (S1009).

The second cleaner 400 may start cleaning (S1010).

The second cleaner 400 may be a robot cleaner to drive for itself.

Figure 12:
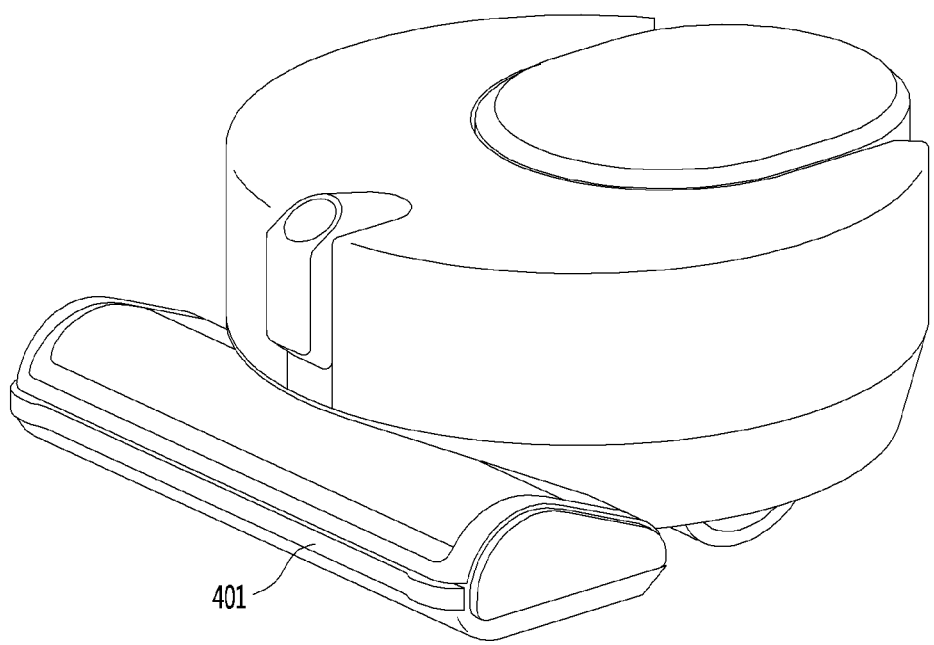
FIG. 12 is a view illustrating a second cleaner according to an embodiment of the present disclosure.

Referring to FIG. 12, the second cleaner 400 may include at least one 3D sensor provided on the head 401 and may include at least one bumper sensor provided on each surface of the head 401. For example, the second cleaner 400 may include bumper sensors provided on each of the front surface, the left surface, and the right surface of the head 401.

The second cleaner 400 may store the received and trained stuck area classification model, may provide 3D sensor data, which is acquired during traveling, to the trained stuck area classification model, may acquire area classification data representing whether the second cleaner is positioned in the stuck area, and may perform the escape travelling when the second cleaner is positioned in the stuck area.

The present disclosure may also be embodied as computer readable codes on a computer readable recording medium. The computer readable recording medium is any data storage device that may store data which may be thereafter read by a computer system. Examples of the computer readable recording medium include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

What is claimed is:

1. A method for sharing information of a stuck area, the method comprising:
    receiving three-dimensional (3D) sensor data and bumper sensor data from a first cleaner;
    generating surrounding situation map data based on the 3D sensor data and the bumper sensor data;
    generating learning data by labeling area classification data for representing whether the surrounding situation map data corresponds to the stuck area;
    training a stuck area classification model based on the learning data; and
    transmitting the trained stuck area classification model to a second cleaner,
    wherein the generating learning data includes:
    acquiring, from the surrounding situation map data, escape path data until the first cleaner completes an escape from the stuck area;
    determining classification of the stuck area based on the escape path data; and
    labeling the area classification data for representing the classified stuck area, on the surrounding situation map data, and
    wherein the acquiring of the escape path data includes:
    determining that the first cleaner completes the escape from the stuck area, when a preset number of times or less of bumper events occurs for a preset time from a time point at which the surrounding situation map data is determined as corresponding to the stuck area.

2. The method of claim 1, wherein the generating of the surrounding situation map data includes:
    generating the surrounding situation map data based on the 3D sensor data and the bumper sensor data for a preset time.

3. The method of claim 1, wherein the generating of the learning data includes:
    determining whether the surrounding situation map data corresponds to the stuck area, based on the bumper sensor; and
    labeling area classification data for classifying surrounding situation map data, which corresponds to the stuck area, as the stuck area.

4. The method of claim 3, wherein the determining of whether the surrounding situation map data corresponds to the stuck area includes:
    determining that the surrounding situation map data corresponds to the stuck area for a preset time, when a bumper event occurs in a preset number of times for the preset time.

5. The method of claim 3, wherein the bumper sensor data includes:
    data on a bumper event sensed by a plurality of bumper sensors of the first cleaner, and
    wherein the determining of whether the surrounding situation map data corresponds to the stuck area includes:
    determining that the surrounding situation map data corresponds to the stuck area for a preset time, when the bumper event occurs in the plurality of bumper sensors of the first cleaner for the preset time.

6. The method of claim 3, wherein the receiving of the 3D sensor data and the bumper sensor data from the first cleaner includes:
    receiving path data of the first cleaner.

7. The method of claim 1, wherein the classification of the stuck area includes:
    acquiring an escape direction based on the escape path data; and
    determining the classification of the stuck area in the escape direction.

8. The method of claim 1, wherein the second cleaner receives the trained stuck area classification model from the first cleaner, stores the received and trained stuck area classification model, provides 3D sensor data, which is acquired during traveling, to the trained stuck area classification model, acquires area classification data representing whether the second cleaner is positioned in the stuck area, and performs escape travelling when the second cleaner is positioned in the stuck area.

9. An artificial intelligence (AI) apparatus, the AI apparatus comprising:
    a communications interface configured to receive 3D sensor data and bumper sensor data from a first cleaner;
    a processor configured to generate surrounding situation map data based on the 3D sensor data and the bumper sensor data; and
    a learning processor configured to generate learning data by labeling area classification data for representing whether the surrounding situation map data corresponds to the stuck area, and to train a stuck area classification model based on the learning data; and
    wherein the processor is configured to:
    transmit the trained stuck area classification model to a second cleaner, wherein the learning processor is configured to:

acquire, from the surrounding situation map data, escape path data until the first cleaner completes an escape from the stuck area, determine classification of the stuck area based on the escape path data, and label the area classification data for representing the classified stuck area, on the surrounding situation map data, and wherein the learning processor is further configured to determine that the first cleaner completes the escape from the stuck area, when a preset number of times or less of bumper events occurs for a preset time from a time point at which the surrounding situation map data is determined as corresponding to the stuck area.

10. The AI apparatus of claim 9, wherein the processor is configured to:

generate the surrounding situation map data based on the 3D sensor data and the bumper sensor data for a preset time.

11. The AI apparatus of claim 9, wherein the learning processor is configured to:

determine whether the surrounding situation map data corresponds to the stuck area, based on the bumper sensor; and label area classification data for classifying surrounding situation map data corresponding to the stuck area as the stuck area.

12. The AI apparatus of claim 11, wherein the learning processor is configured to:

determine that the surrounding situation map data corresponds to the stuck area for a preset time, when a bumper event occurs in a preset number of times for the preset time.

13. The AI apparatus of claim 11, wherein the bumper sensor data includes:

data on a bumper event sensed by a plurality of bumper sensors of the first cleaner, and wherein the learning processor is configured to:

determine that the surrounding situation map data corresponds to the stuck area for a preset time, when the bumper event occurs in the plurality of bumper sensors of the first cleaner for the preset time.

14. The AI apparatus of claim 11, wherein the communications interface receives path data of the first cleaner.

15. The AI apparatus of claim 9, wherein the learning processor is further configured to:

acquire an escape direction based on the escape path data; and determining the classification of the stuck area in the escape direction.

16. The AI apparatus of claim 9, wherein the second cleaner receives the trained stuck area classification model from the first cleaner, stores the received and trained stuck area classification model, provides 3D sensor data, which is acquired d during traveling, to the trained stuck area classification model, acquires area classification data representing whether the second cleaner is positioned in the stuck area, and performs escape travelling when the second cleaner is positioned in the stuck area.

* * * * *